United States Patent [19]

Fassauer

[11] 3,800,745
[45] Apr. 2, 1974

[54] ANIMAL FEEDER

[76] Inventor: Arthur L. Fassauer, P.O. Box 615, Canyon, Tex. 79015

[22] Filed: July 27, 1972

[21] Appl. No.: 275,756

[52] U.S. Cl.............. 119/51.11, 119/56 R, 222/383, 259/44
[51] Int. Cl.............................................. A01k 5/02
[58] Field of Search............ 119/51.11, 56 R, 56 A; 222/383, 564; 241/46 A, 46 B, 186 R; 259/43, 44, DIG. 25, DIG. 26

[56] References Cited
UNITED STATES PATENTS

| 3,547,081 | 12/1970 | Geerlings | 119/51.11 |
| 3,165,271 | 1/1965 | Enright | 241/46 B X |
| 3,239,199 | 3/1966 | Jameson | 259/43 |
| 2,268,038 | 12/1941 | Knittel | 259/43 |

*Primary Examiner*—Robert Peshock
*Assistant Examiner*—J. A. Oliff

[57] ABSTRACT

A hopper stores a quantity of dry, particulate animal feed and is partially closed at the bottom by a feed guide plate having downwardly curved sides and a central circular orifice. The orifice extends into an agitator chamber having generally conical wall surfaces and a flat circular floor. The conical walls of the agitator chamber include a discharge opening which leads to a delivery chute. A motor driven agitator blade having an upstanding feeder shaft extending into the hopper orifice is rotatably mounted above the floor of the agitator chamber. When the motor is energized rotation of the agitator blade, including the feeder shaft, causes feed to flow from the hopper orifice into the path of the agitator blade. The rotating blade fluidizes the feed particles and centrifugally deflects them in a circular path about the chamber walls so that the feed flows through the discharge opening down the delivery chute and into an eating bowl.

11 Claims, 8 Drawing Figures

PATENTED APR 2 1974  3,800,745
SHEET 1 OF 2
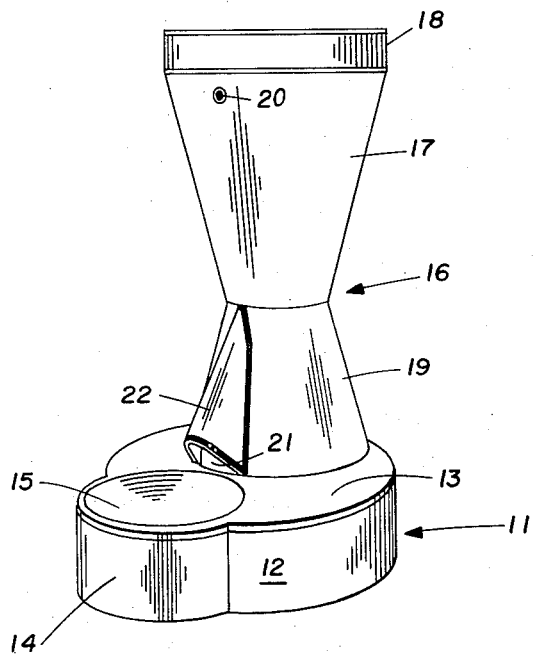
FIG. 1
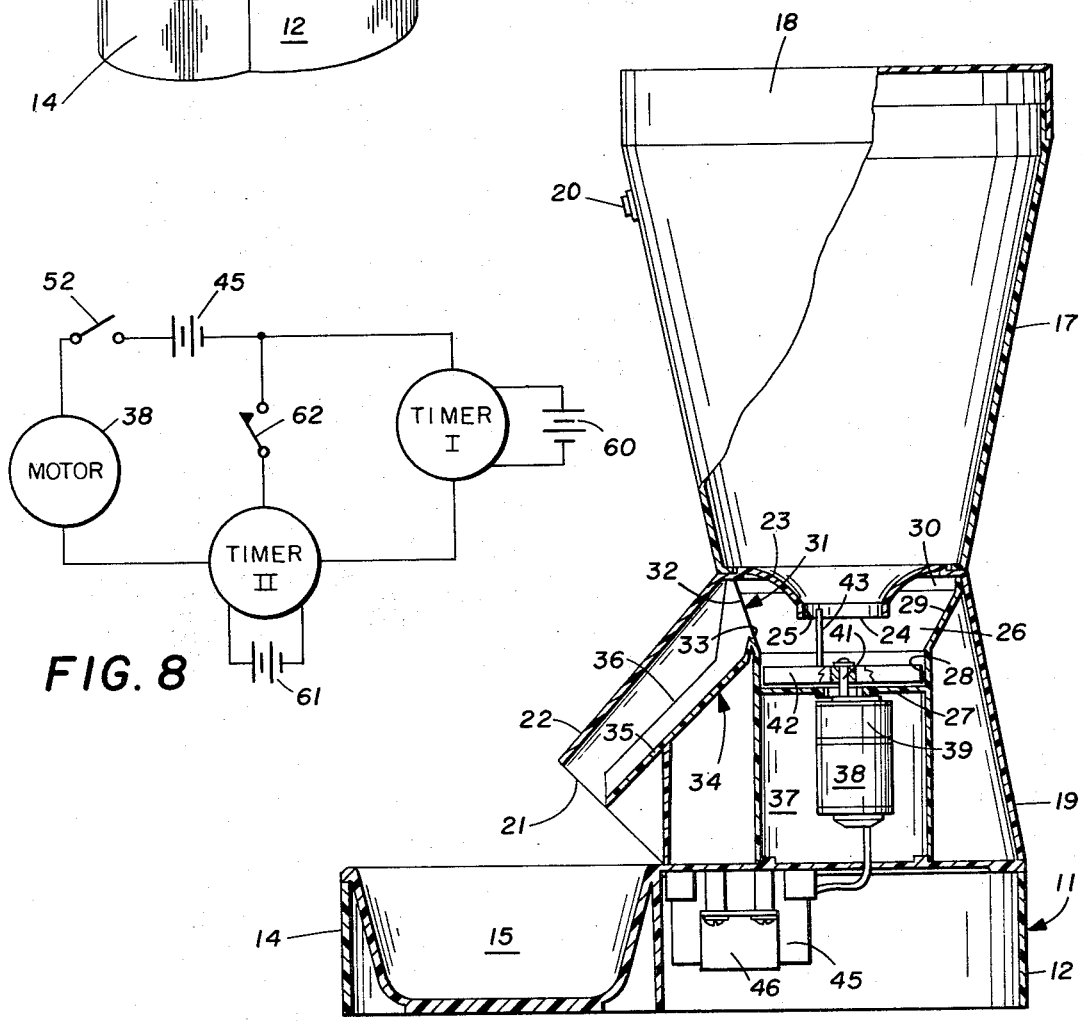
FIG. 8
FIG. 2

ANIMAL FEEDER

BACKGROUND OF THE INVENTION

1. Field of the Invention

The invention relates to animal feeders, and more particularly, to an animal feeder for dispensing predetermined quantities of feed particles into a bowl.

2. History of the Prior Art

In the past animal feeders have been of the type wherein feed is periodically augered from a hopper into a trough or wherein periodic movement of a release gate causes material to drop from a hopper into a receiving receptacle. These types of feeders possess numerous disadvantages in that the feed delivery mechanisms are relatively large and mechanically complex and, consequently, are subject to mechanical malfunction and/or substantial maintenance. Other types of prior art animal feeders have employed centrifugal force for dispensing feed by including rotating pipes and nozzles which project the feed into the ground in a circular pattern about the feeder. Prior art centrifugal feeders also exhibit certain disadvantages, such as a failure to distribute feed into a single, localized area as required for such applications as pet feeding and veterinarial institutions. The present animal feeder overcomes many of the disadvantages of prior art feeders and provides a compact dispensing structure which has few moving parts and accurately dispenses a predetermined quantity of feed.

SUMMARY OF THE INVENTION

The invention relates to animal feeders, and more particularly, to an animal feeder for dispensing quantities of feed particles into a bowl. In accordance with one aspect of the invention an annular, fluidized, circumferentially moving layer of animal feed is generated in an agitation zone. The animal feed is directed from the layer out of the agitation zone at a predetermined rate and additional animal feed is admitted to the agitation zone at the same predetermined rate.

In accordance with another aspect of the invention an upwardly and outwardly tapered conical wall defines an agitation chamber. Outlet means are formed through the conical wall and extend to an animal feeding receptacle. An agitator blade is supported in the bottom of the agitation chamber for rotation about the axis of the conical wall and the blade includes surfaces extending angularly relative to the axis of the conical wall. Means are included for rotating the agitation blade in the agitation chamber at a predetermined rate and thereby forming an annular, fluidized layer of animal feed on the wall which travels circumferentially around the wall for discharge through the outlet means into the animal feeding receptacle. A hopper is mounted above the agitation chamber for receiving a supply of animal feed and means are mounted between the hopper and the agitation zone for directing animal feed from the hopper into the agitation zone at the same rate that animal feed is discharged from the agitation zone through the outlet means.

BRIEF DESCRIPTION OF THE DRAWING

For a more complete understanding of the present invention and for further objects of the advantages thereof, reference may now be had to the following description taken in conjunction with the accompanying drawings in which:

FIG. 1 is a perspective view of the exterior of the animal feeder of the present invention;

FIG. 2 is a side cross section view of the animal feeder of the present invention;

FIG. 8 is a block diagram of an automatic distribution timing circuit used in one embodiment of the invention.

DETAILED DESCRIPTION

Figure 3:
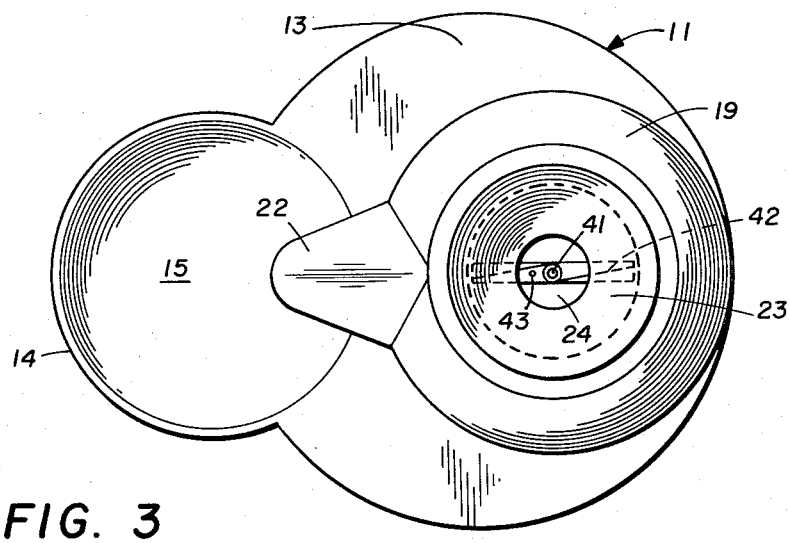
FIG. 3 is a top view of the animal feeder with the hopper removed showing the feed guide plate, agitator chamber and agitator blade structure.

Referring first to FIG. 1, there is shown a perspective view of the outer housing fo the animal feeder of the present invention. The housing includes a base 11 having vertically oriented cylindrical walls 12 and a flat top portion 13. The base 11 includes a cylindrical projection 14 which houses an eating bowl 15. The eating bowl 15 may be formed integrally with the base as shown, or may be removable or include a removable liner for apparent sanitary reasons. Mounted on the top portion 13 of the base 11 is an upstanding hopper and feeder module 16 including a conical hopper section 17 having upwardly and outwardly extending walls and which is closed at the top by a removable cylindrical cover 18. Between the hopper section 17 and the base portion 11 there is a feed distribution section 19 having downwardly and outwardly extending walls. A feed distribution opening 21 is formed in the distribution section 19 and is partially enclosed by a cover member 22. A feed distribution push switch 20 is mounted on the side of the hopper section 17.

Referring now to FIG. 2, there is shown a side cross section view of the animal feeder shown in FIG. 1. The cover 18 is preferably attached to the hopper section 17 by a close sliding fit. Alternatively, mating screw threads may be provided on the two surfaces. The cover 18 is removable in order to permit the hopper to be filled with animal feed preferably in a granular or pelletized form, but also in any other dry, particulate form as may be desirable in particular instances.

The walls of the hopper section 17 extend downwardly and are closed at the bottom by a feed guide plate 23. The guide plate 23 has wall surfaces which are generally hyperbolic in cross section and extend inwardly and downwardly to form a hopper orifice 24. The orifice 24 is defined by a cylindrical ring section 25 connected to the downwardly extending walls of the feed guide plate 23.

Located below the orifice 24 is an agitator chamber 26 which is closed at the bottom by a flat circular floor 27. The sides of the chamber 26 are formed by cylindrical walls 28 which extend upwardly from the foor 27 and which are connected to upwardly and outwardly flaring conical walls 29. The conical walls 29 are joined to a short cylindrical ring section 30 which abuts the bottom of the hopper 17. The agitator chamber 26 is partially enclosed at the top by the bottom surface of the feed guide plate 23.

Figure 4:
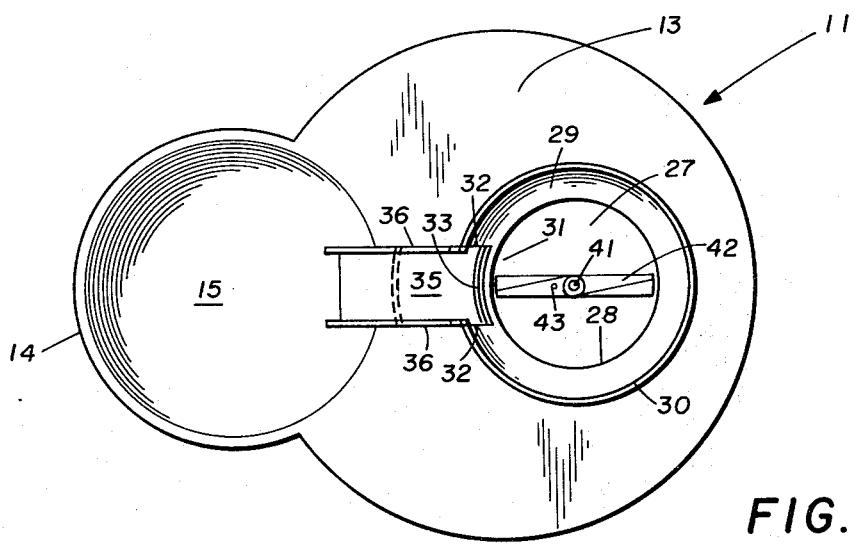
FIG. 4 is a top view of the animal feeder with both the hopper and the feed guide plate and the chute cover removed showing the agitator chamber and agitator blade structure.

The conical walls 29 of the agitator chamber 26 are interrupted by a discharge opening 31 as is best shown in FIGS. 2 and 4. The discharge opening 31 is defined by a pair of opposed parallel side edges 32 and a horizontal bottom edge 33. The bottom edge 33 is located slightly above the juncture of the cylindrical walls 28 and the conical walls 29.

The discharge opening 31 leads into a feed delivery chute 34 having a flat inclined bottom 35, and parallel, vertically extending sides 36. The sides 36 fit within the inner walls of the cover member 22 which encloses the chute.

A motor chamber 37 is located beneath the agitator chamber 26. An electric motor 38 connected through a speed reducer 39 is mounted within the chamber 37. The output shaft 41 of the speed reducer 39 extends up into the agitator chamber 26 through an opening in the center of the floor 27. An agitator blade 42 is fixed to the end of the output shaft 41 above the surface of the circular floor 27. An upstanding feeder shaft 43 is mounted to the blade 42, spaced from the shaft 41, and extending up into the hopper orifice 24. Upon energization of the motor 38, the blade 42 rotates within the cylindrical walls 28 of the agitator chamber 26 and the feeder shaft 43 moves in a circular path within the hopper orifice 24.

The motor 38 is powered by current from a battery 45 which is mounted to the underside of the base 11 by a clamp assembly 46. The motor and battery are interconnected with the actuation switch 20 via leads (not shown) which lie within a channel in the walls of the hopper 17.

Figure 6:
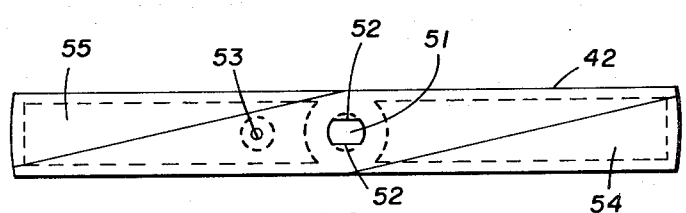
FIG. 6 is a top view of the agitator blade of FIG. 5.
Figure 5:
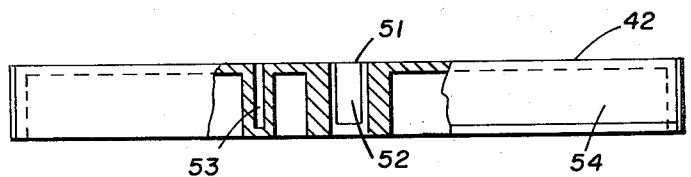
FIG. 5 is a partially cutaway side view of the agitator blade used in the invention.
Figure 7:
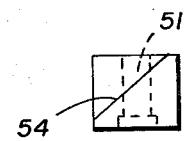
FIG. 7 is an end view of the agitator blade of FIG. 5.

As shown in FIGS. 5 and 6, the agitator blade 42 includes a central opening 51 having a pair of opposed flat shoulder portions 52 which lock the blade to mating surfaces on the output shaft 41 (FIG. 2). The blade 42 also includes a socket 53 which extends parallel to and spaced from the opening 51. The socket 53 receives the lower end of the feeder shaft 43. As shown best in FIG. 7, the blade 42 includes a pair of beveled surfaces 54 and 55.

Before operation, the feeder of the invention is filled by removing the cover 18 from the hopper 17 and placing a supply of dry, particulate feed therein. The feed guide plate 23 prevents feed in the hopper from flooding into and choking the agitator chamber 26. Instead, a limited amount of feed passes through the hopper orifice 24 until the flow is restricted by either material lying at the angle of repose beneath the orifice 24 or by bridging within the orifice 24.

When the distribution switch 20 is pressed, the motor 38 is energized to rotate the output shaft 41 and the agitator blade 42. When the agitator blade 42 is rotating, movement of the feeder shaft 43 in a circular path within the orifice 24 breaks any bridges which may have developed and causes the feed to flow down into the agitator chamber 26 into the path of the agitator blade 42. The surfaces 54 and 55 of the agitator blade 42 strike the feed particles and move them in a pattern up onto and about the conical walls 29, in the direction of rotation of the blade 42. The centrifugal and agitating motion imparted to the feed particles in the chamber 26 produces an expansion and fluidization of the mass into an annular moving layer of material disposed about the conical chamber walls 29. When the individual particles in the fluidized mass moving centrifugally about the walls 29 reach the discharge opening 31, they move outwardly between the edges 32 and down the feed delivery chute 34. The appearance of the feed within the agitator chamber as it is being dispensed is that of an annular fluidized mass of particles thinly covering the conical wall surfaces 29 and moving in a circumferential pattern about the walls with a portion of the mass flowing smoothly out of the agitation zone and through the discharge opening 31. As the dispensed feed moves out of the agitator chamber 26, more feed passes into the chamber through the orifice 24 due to the action of feeder shaft 43.

A very important feature of the invention comprises the cooperation between the hopper section 17, the feed guide plate 23 and extending to the orifice 24, and the agitator chamber 26. During the operation of the animal feeder, additional animal feed is admitted through the orifice 24 at exactly the same rate that animal feed is discharged through the opening 31. By this means the quantity of animal feed within the chamber 26 is maintained constant throughout the operation of the device.

One feature of the operation of the present invention is that for a particular size and weight of feed particles the mass of feed delivered is linearly related to the time interval of actuation. That is, the cooperation of the parts of the feeder including the manner in which the feed is fluidized with particles being distributed in an annular layer about the conical walls of the agitator chamber is such that for each second of energization a metered quantity of feed is dispensed. By controlling the time period during which the switch 20 is closed the dispensed quantity of feed may be controlled to a high degree of accuracy.

The animal feeder of the present invention, in addition to being adapted for actuation by the momentary press switch 23, can also be automatically operated at preselected times to run for a preselected dispensing interval. As pointed out above, actuation of the unit for a given period of tme results in dispensing a metered quantity of feed into the bowl 15. This feature is particularly important for veterinarial institutions and laboratories in that it ensures that the animals being fed receive rigorously controlled diets with a preselected quantity of feed being dispensed at preselected hours of the day. Also, this feature enables a pet owner to leave the animal alone for several days with the assurance that it will be regularly fed.

As shown in FIG. 8, an alternate embodiment of the invention involves timing circuitry whereby the feeder is automatically actuated at predetermined times during the day, under control of Timer I. Each actuation is for only a preselected period of time, under control of Timer II, in order to measure out a desired quantity of feed. Both Timer I and Timer II may be mechanically operated or be powered by batteries 60 and 61, as shown. As illustrated in FIG. 8, one terminal of the battery 45 is connected through an on-off switch 52 to the motor 38. The other terminal of the battery 45 is connected to Timer I. Timer I is adapted to momentarily energize Timer II which then locks itself to the battery terminal, via contacts 62, and remains energized for a preselected period of time. While Timer II is operated, power supplied is from the battery 45, through contacts 62 and Timer II to energize the motor 38 and distribute feed into the bowl 15 (FIG. 2). Once Timer II has finished its timing cycle, the circuits, including contacts 62, is again opened and is ready for re-energization by Timer I at the next feeding time.

It is to be understood that the operative portion of the animal feecer of the present invention can be placed in other housings more adapted for the feeding of larger animals such as horses, which might include larger hopper sections and feeding troughs. While it may be necessary to change some of the dimensions of various parts of the feeder, the basic structure and operation remains the same. Further, in each instance where a battery is called for herein it is to be understood that other types of power sources, such as a rectifier power supply, could be used.

By way of specific example of one embodiment of the invention, the hopper 17 was filled with a 35-pound mass of discrete feed particles of "Gaines Meal," each particle having a cylindrical configuration approximately five-sixteenth inch in diameter. The motor 38 used was a 1/15 horse power 1750 RPM d.c. motor. The speed of the output shaft 41 was reduced by the speed reducer 39 to a substantially constant speed of about 160 RPM. When the motor was energized the centrifugal and agitating motion imparted to the feed particles in the chamber 26 produced an expansion and fluidization of the mass along the conical chamber walls 29. As the particles moved circularly about the walls 29, they flowed radially through the discharge opening 31 and out the distribution opening 21 into the eating bowl 15. Despite the relatively high speed of the agitator blade 42, the particles were delivered into the bowl 15 without breakage and with an accuracy of ± 8 grams in each 250 gram distribution sample over a total delivery of 35 pounds. Considerably larger or smaller size feed particles can be handled by the feeder of the present invention with equal facility by merely changing the dimensions of the parts.

Having described the invention in connection with certain specific emgodiments thereof, it is to be understood that further modification may now suggest themselves to those skilled in the art and is intended to cover such modifications as fall in the scope of the appended claims.

What is claimed is:

1. An animal feeder comprising:
   means including an agitator blade rotating at a predetermined velocity for generating a fluidized, circumferentially traveling body of animal feed in an agitation zone comprising a substantially flat, generally horizontally disposed floor and a generally upwardly extending annular wall encircling the floor;
   said agitator blade being mounted in the bottom of said agitation zone adjacent said floor;
   a discharge opening formed in the annular wall for receiving feed from the traveling body thereof and thereby directing animal feed out of the agitation zone at a predetermined rate; and
   means for admitting additional animal feed to the agitation zone at the same predetermined rate.

2. An animal feeder comprising:
   means defining a supply of particulate animal feed;
   an agitator chamber comprising a substantially flat, horizontally disposed floor and an upwardly and outwardly tapered conical wall extending around the floor and having a discharge opening formed in it;
   means for directing animal feed from the supply means to the agitator chamber;
   an agitator mounted in the bottom of the agitator chamber;
   means for rotating the agitator in the agitator chamber at a predetermined rate and thereby forming a fluidized zone of animal feed on the conical wall of the chamber which moves circumferentially along the wall and out through the discharge opening during the portion of each rotation of the agitator in which the fluidized zone is aligned with the opening.

3. An animal feeder as set forth in claim 2 wherein said directing means includes a feed guide plate mounted beneath said supply means, said plate having inwardly and donwardly directed surfaces to define an orifice for restricting the passage of feed therethrough.

4. An animal feeder as set forth in claim 3 wherein said supply means includes an elongate vertically extending hopper and wherein said feed guide plate forms the bottom of said hopper.

5. An animal feeder as set forth in claim 4 wherein said rotating means includes electric motor means having an output vertically extending shaft from the bottom of the agitator chamber, and wherein
   said agitator includes a blade fixed to the output shaft for rotation about its central axis.

6. An animal feeder as set forth in claim 3 wherein said directing means also includes a feeder shaft mounted to said agitator and extending up into the orifice of said feed guide plate for movement within said orifice upon rotation of said agitator to produce feed flow from said supply means into said agitator chamber.

7. An animal feeder comprising:
   a substantially flat, generally horizontally disposed floor and an upwardly and outwardly tapered conical wall encircling the floor for cooperation therewith to define an agitation chamber;
   outlet means formed through the conical wall and extending to an animal feeding receptacle;
   an agitator blade supported in the bottom of the agitation chamber for rotation about the axis of the conical wall and comprising surfaces extending angularly relative to the axis of the conical wall;
   said agitator blade having a top surface located beneath the bottom of the outlet means;
   means for rotating the agitation blade in the agitation chamber at a predetermined rate and thereby forming a fluidized layer of animal feed on the wall which extends above the top surface of the blade and above the bottom of the outlet means and which travels circumferentially around the wall for discharge through the outlet means into the animal feeding receptacle during the portion of each rotation of the blade in which the fluidized layer is aligned with the outlet means;

a hopper mounted above the agitation chamber for receiving a supply of animal feed; and means mounted between the hopper and the agitation zone for directing animal feed from the hopper into the agitation zone at the same rate that animal feed is discharged from the agitation zone through the outlet means.

8. An animal feeder as set forth in claim 7 wherein said directing means includes:

a feed guide plate having a reduced orifice therein for restricting the flow of feed from said hopper to said agitation chamber; and means extending from said chamber into said orifice and adapted for movement within said orifice upon rotation of said blade for preventing the formation of feed bridges within said orifice and producing a flow 22 feed into said chamber.

9. An animal feeder as set forth in claim 8 wherein said means extending into said orifice includes an upstanding feeder shaft mounted to said blade, said shaft being parallel to but spaced from the axis of rotation of said blade.

10. An animal feeder as set forth in claim 7 wherein said rotating means includes an electric motor having an output shaft connected to said agitator blade.

11. An animal feeder as set forth in claim 7 which also includes:

means for energizing said rotating means at selected intervals for preselected time periods to dispense a preselected quantity of feed into the animal feeding receptacle.

* * * * *

PO-1050
(5/69)

UNITED STATES PATENT OFFICE
CERTIFICATE OF CORRECTION

Patent No. 3,800,745          Dated April 2, 1974

Inventor(s) Arthur L. Fassauer

It is certified that error appears in the above-identified patent and that said Letters Patent are hereby corrected as shown below:

```
Col. 1, line 22, "intothe ground" should be -- onto the ground
Col. 2, line 31, "housing fo the" should be --housing of the--.
Col. 3, line 4, "foor 27" should be --floor 27--.
Col. 4, line 46, "press switch 23" (press switch 23 was changed
                 to press switch 20 everywhere but here by
                 Examiner's amendment.
        line 49, "of tme" should be --of time--.
Col. 5, line 9, "circuits" should be --circuit--.
Col. 6, line 25, "donwardly" should be --downwardly--.
Col. 8, line 1, "flow 22 feed" should be --flow of feed--.
```

Signed and sealed this 8th day of October 1974.

(SEAL)
Attest:

McCOY M. GIBSON JR.          C. MARSHALL DANN
Attesting Officer            Commissioner of Patents